US006706795B1

(12) United States Patent
Garti et al.

(10) Patent No.: US 6,706,795 B1
(45) Date of Patent: Mar. 16, 2004

(54) METHODS FOR THE PREPARATION OF NANOSIZED MATERIAL PARTICLES

(75) Inventors: Nissim Garti, Jerusalem (IL); Yana Berkovich, Jerusalem (IL)

(73) Assignee: Yissum Research Development Company of the Hebrew University of Jerusalem, Jerusalem (IL)

( * ) Notice: Subject to any disclaimer, the term of this patent is extended or adjusted under 35 U.S.C. 154(b) by 0 days.

(21) Appl. No.: 09/622,299

(22) PCT Filed: Feb. 16, 1999

(86) PCT No.: PCT/IL99/00097

§ 371 (c)(1),
(2), (4) Date: Sep. 11, 2000

(87) PCT Pub. No.: WO99/43427

PCT Pub. Date: Sep. 2, 1999

(30) Foreign Application Priority Data

Feb. 26, 1998 (IL) .................................................. 123468

(51) Int. Cl.⁷ .............................. C08K 3/08; C08K 3/18; B01F 3/12; B01J 13/02
(52) U.S. Cl. ...................... 524/431; 75/721; 252/62.54; 427/212; 428/402; 516/33; 516/34; 516/95; 516/97; 524/440
(58) Field of Search .......................... 427/212; 428/402; 516/34, 95, 97, 33; 252/62.54; 524/440, 431; 75/721; 423/DIG. 14

(56) References Cited

U.S. PATENT DOCUMENTS

| 4,606,764 | A | * | 8/1986 | Hazen et al. ................. 75/121 |
| 4,612,138 | A | * | 9/1986 | Keiser .......................... 516/95 |
| 4,652,311 | A | * | 3/1987 | Gulla et al. ................. 516/97 X |
| 4,871,790 | A | * | 10/1989 | Lamanna et al. ....... 524/431 X |
| 5,147,841 | A | * | 9/1992 | Wilcoxon .................... 502/173 |
| 5,316,699 | A | * | 5/1994 | Ritter et al. ............. 524/431 X |
| 5,620,584 | A | * | 4/1997 | Reetz et al. ................. 205/334 |
| 5,776,360 | A | * | 7/1998 | Sieber ................. 252/62.54 X |
| 5,879,715 | A | * | 3/1999 | Higgins et al. ......... 428/402 X |
| 5,938,934 | A | * | 8/1999 | Balogh et al. .......... 524/440 X |
| 6,048,920 | A | * | 4/2000 | Ziolo et al. ............. 524/431 X |
| 6,054,507 | A | * | 4/2000 | Funaki et al. ........... 524/440 X |
| 6,090,858 | A | * | 7/2000 | El-Sayed ..................... 516/97 |
| 6,228,904 | B1 | * | 5/2001 | Yadav et al. ......... 252/62.54 X |
| 6,268,041 | B1 | * | 7/2001 | Goldstein ................... 428/402 |

FOREIGN PATENT DOCUMENTS

WO    WO97/24224    * 7/1997

* cited by examiner

*Primary Examiner*—Richard D. Lovering
(74) *Attorney, Agent, or Firm*—Fay, Sharpe, Fagan, Minnich & McKee, LLP

(57) ABSTRACT

The present invention relates to a method for the production of particles of nano-materials being transition metals and alloys; metal oxides; and ceramic compositions having a small nanosize, i.e. about 1–6 nm. The method comprises a synthesis in the solutions of complex liquids from suitable precursors, which precursors are selected from suitable surfactants and alkoxides, by a suitable chemical reaction under mild conditions; and preparing from said materials fine colloids dispersed in various polymer solutions. The water in the solution is preferably non freezing water, the mild conditions are atmospheric pressure and a temperature range of room temperature to 70° C., and the reaction condition is selected among a hydrolysis, reduction and exchange process.

17 Claims, No Drawings

METHODS FOR THE PREPARATION OF NANOSIZED MATERIAL PARTICLES

This application is a 371 of PCT/IL99/00097 filed Feb. 16, 1999.

The present invention relates to the methods for the preparation of nanosized material particles. ("Nanomaterials" in connection with the present invention comprise transition metals and alloys; metal oxides; and ceramic compositions having a small nanosize, i.e. about 1–6 nm.) Nanomaterials are prepared from the corresponding precursors i.e. the corresponding metal salts or alkoxides by suitable chemical reactions, e.g. reduction, hydrolysis and exchange processes under mild conditions.

There are known methods to prepare clusters or fine colloids from said nanomaterials which are dispersed in different suitable solutions. Appropriate liquid media enable the production of different preparations, which may be used as thin films on various supports.

There are known several methods for the preparation of ultrathin films of metal particles on solid supports, e.g. ion implantation (M. Che. C.O. Bennet, Adv. Catal. 1989, 36, 55); organometallic chemical vapor deposition (A. Sherman, Chemical vapor Deposition for Microelectronics, Principles, Technology and Application. Noyes Publications; Park Ridge, N.J. 1987; and N. E. Dryden et. al., Chem. Mater. 1991, 3, 677); metal deposition from colloidal solution (G. Schmid, Chem. Rev. 1992, 92, 1709); reductive metal deposition from aqueous salt solution (I. Coulthard, et. al., Langmuir 1993, 9, 3441.): photodecomposition of metal complexes in thin films (R. Krasnasky et. al. Langmuir, 1991, 7, 2881); and photo-reductive deposition from Pd(II) complexes in solution (K. Kondo et. al., Chem. Lett. 1992, 999) Other technics are based on the film formation of noble metal loaded block copolymers (Y. NgCheongChan et. al., Chem. Mater. 1992, 4, 24; and J. P. Spatz, et al., Adv. Mater. 1995, 7, 731.); on the Langmuir-Blodget (LB) transfer of monolayers or surfactant stabilized metal colloids (F. S. Meldrum et. al., Langmuir 1994, 10. 2035; and F. S. Meldrum. et al., Chem. Mater. 1995. 7, 1112); and on thermal decomposition of LB films of zero valent palladium complexes (E. Maasen et. al., Langmuir 1996, 12, 5601).

At present the microelectronic and some related industries, mainly continue to use the vapor deposition method. The "Wet" method, which is a method of film deposition from solutions, provides a good challenge for the industry since it does not require high temperatures and pressures or high vacuum and enables to vary the properties of the nano compositions to a large extent During the last decade, the number of scientific works devoted to the synthesis of nanomaterials in solutions has significantly increased. Certain practical results were reported. Thus, for example G. Schmid (see above) demonstrated that the pellets which consist of ligand stabilized golden clusters (derived from a liquid) may be regarded as tunneling resonance resistors and, additionally, as cellular automates. The density of electronic switches, compared with common semiconductors increased in another example to a factor of $10^5$–$10^6$. Another paper (T. Yamamoto, in Macromolecular Complexes, Ed. by Eishun Tsuchida, VCH, 1993, 380–395.) informed about the preparation of electrically conducting polymer compositions by using organosols of metal sulfides. The polymer-composite films not only show good electrical conductivity but were also controlled to p- or n-type conductors.

The realization of quantum dots, of uniform size and structure opens the door to multiple switches. This enables the manufacture of new generations of computers with extremely high capacities. The manufacture of novel mini-lasers, based on quantisizing particles, will most probably lead to optoelectronic switches, operated simultaneously by photons and electrons. Nanometal coatings may be effectively used, e.g as film catalysts (for instance in the processes of electroless metal deposition); and as modifiers of mechanical properties of different materials.

However, all said conventional methods are not satisfactory in the preparation of coatings comprising nanomaterial particles, as they are rather complicated, expensive or do not yield the particles having the desired size.

It has thus been desirable to find a method which would overcome said disadvantages, i.e should not be complicated, not be too expensive and yield nanomaterial particles having the desired size.

It is well known that water which appears to be a key factor which governs the association of surfactants in different solvents, functions not only as an inert solvent but plays a significant part in the mechanism of chemical processes. (Garti et. al. Coll. & Interface Sci. 178 (1996) p. 60–68). When describing the state of water in relation to any surface a distinction is usually made between "bulk" and "bound" water. It is assumed that "bulk" or free water has physico-chemical properties which are not very different from those of pure water. "Bound" water may be defined by the operational definitions which refer to the water detected by a certain technique.

According to the method utilized by Senatra (D. Senatra et. al. Can. J. of Phys. 68 (1990) p. 1041), in which the endothermic scaling made was applied and the peaks representing various states of water were identified and analyzed, it was shown that "free" water melts at 0° C., "interfacial bound" water melts at −10° C., and non-freezing water which is the most strongly bound part of bound water has no peaks on thermograms up to −100° C.

It has been found that the state of the water in water-organic-surfactant organized solutions is strictly correlated with the size of the particles. Particles which have a diameter of less than 5 nm are synthesized in systems which comprise only strongly bound water (non freezing water according to subzero differential scanning Calorimetry DSC).

In developing the method according to the present invention it has been considered:

a. producing the water-organic-surfactant organized solutions (complex liquids) comprising nanosized particles in particular having a diameter of 1–5 nm which are useful for the particle preparation;

b. regulating the water content in such a manner that the whole water will be strongly bound to the surfactant (non-freezing) in the system, thus enabling to provide nano particles which have a diameter of less than 5 nm;

c. the regulation of the solution structures which enables the regulation of the morphology of the particles;

d. the variation of the chemical composition and concentration of nano-precursors (and of the complementary reactants), which enables the control of the particle size distributions (PSD) and of the thickness of the protecting shells;

e. using different polymers which enable the production of films having different adhesion properties, by the deep coating method; and f. the control of the viscosity and of the velocity of the solutions which lead to different film thicknesses;

The optimization of the above-mentioned factors (which should operate simultaneously) should lead to the production of the coating having the desired properties.

The present invention thus consists in a method for the production of nanomaterial particles (as herein defined) in which:

said nanomaterial particles are synthesized in the solutions of complex liquids containing non-freezing water from suitable precursors, which precursors are selected from suitable surfactants, metal salts and alkoxides by a suitable chemical reaction under mild conditions; and preparing from said materials fine colloids dispersed in various polymer solutions.

The nanomaterial particles have advantageously a diameter of 1–5 nm.

The water in the solution is advantageously non-freezing water as determined by low temperature different scanning calorimetry The suitable chemical reaction may be selected, for example, among reduction, hydrolysis and exchange processes.

Mild conditions in connection with the present invention are suitably atmospheric pressure and a temperature range of room temperature to 70° C.

Suitable solutions may be selected among suitable water-organic-surfactant solutions; (microemulsions; liquid crystalline media; etc.)

Suitable organic solvents may be, e.g. selected among suitable hydrocarbons (octane, decane, dodecane); chlorinated hydrocarbons (1,2-dichloroethane); ethers (ethylether); etc.

The appropriate liquid media enable the preparation of different self assemblies of nanomaterials and subsequently the use of them as thin films on various supports.

Suitable surfactants are, for example,:

Quaternary ammonium salts, e.g. trioctylmethyl ammonium chloride (Aliquat 336), dioctyldimethylammonium bromide (DDAB), cetyltrimethylamnonium chloride (CTAB), etc,; sodium bis-(2-ethyl-hexyl)-sulfosuccinate; poly-ethoxyethylene-10-oleyl ether (Brij 96; etc. Metal oxide precursors may be, e.g. alkoxides:

tetraethoxy silane (TEOS); tetramethoxy silane (TMOS); Al, Zr isopropoxides, etc.;

Fe, Mg and Al chlorides; Al and Mg acetates; Na and K orthosilicates; Zr oxychloride; etc. Metal precursors may be, e.g. transition metal salts of Fe, Co, Ni, Cu, Ru, Rh, Pd, Ir and Pt, e.g. $FeCl_3$, $K_2PDCl_4$, $K_2PtCl_4$ and $CuCl_2$.

The polymers may be selected, e.g. from polyethylene oxide (PEO), polyvinyl chloride (PVC), polyvinyl alcohol (PVA), polymethyl methacrylate (PMMA), etc.

Suitable reducing agents are, for example, sodium formate; hydrogen; certain alcohols (methanol, ethanol, isopropylalcohol); etc.

The method according to the present invention can direct the morphology, dimension and homogeneity of the size distributions of the small colloids (and clusters) and also their self assembling.

EXAMPLE 1

A Pd colloidal dispersion was prepared from a solution containing 12% wt of hydrated trioctylmethylammonium chloride (aliquat 336) which corresponds to water/aliquat molar ratio=3.06. Sub-zero DSC analysis did not reveal any peak which belongs to interfacial (−10° C.) and free water (0° C.) in the precursor solution.

Potassium tetrachloropalladate ($K_2PdCl_4$) (326 mg) was solubilized in a 5 ml aliquat-dichloroethane-water mixture. Sodium formate ($NaHCO_2$) (0.22 gr) was poured onto the mixture under argon. The reaction was carried out in accordance with the following formula:

$$K_2PdCl_4 + 2NaHCO_2 = Pd + 2NaCl + 2KCl + 2CO_2 + H_2$$

The reaction was carried out at 75° C. In the course of the reaction, the orange color gradually changed to a dark brown color. The reaction was stopped after 1 hour and the dichloroethane was evaporated from the reaction mixture. The waxy residue obtained, was washed, in order to remove the inorganic salts, with deionized water and dried at 30 torr and 60° C.

Electron diffraction date revealed a face centered-cubic (fcc) Pd phase, while Transmission Electron Microscopy (TEM) analysis showed round particles having a mean diameter of 1.8 nm.

The nanometal prepared was redispersed in 40 ml of dichloroethane containing 30% of a v/v Polyvinyl alcohol (PVA). The viscosity of the solution was 40 cps.

The surface of a glass plate was thoroughly cleaned with hot water, methyl alcohol and diethyl ether. A coating was prepared by drawing with the velocity of 8 nm/sec. The bright orange transparent film obtained had a magnitude of electrical conductivity $10^{-8}$ $\Omega^{-1}cm^{-1}$.

EXAMPLE 2

1.25 g of a commercially available nonionic surfactant Brij-96 (poly-ethoxyethylene-10-oleyl ether $C_{18}H_{35}$ ($OCH_2CH_2$)OH (PEO) was added to a mixture of 4 ml of hexane and 1.18 g of i-butanol. 1 ml of a 0.025M solution of FeCl; in 0.01 HCl was then poured on the mixture. The mixture was homogenized by Vortex and it then looked like a homogenous solution. The sub-zero DSC analysis did not reveal any peak which belong to freezing water. After an ageing process at 40° C. in the course of 48 hr, TEM and small angle X-ray scattering (SAXS) there were visualized particles having a mean diameter of 3.5 nm and 10% degree of polydispersion. Photoelectronic Spectroscopy (XPS) analysis indicated FeOOH formation. The microemulsion was concentrated by evaporation at 35° C. and 60 torr and the wax residue obtained was redispersed in 10 ml of Polyethylene glycol (PEO). The viscosity of the solution was 9.3 cps. A coating was prepared by drawing with the velocity of 12 mm/sec. Corning glass plates were soaked in ethanol solutions in the course of 24 hr rinsed with distilled water under sonication, then immersed in ethanol and dried at 105° C. for 8 hr. A film was formed on the glass plate by spreading of the solution. After a film heat treatment at 45° C. the film was not cracked or destroyed. Scanning electron microscopy (SEM) of the coating (removed from the support) did not show any growth of the particles.

EXAMPLE 3

0.5 g of commercially available surfactant didodecylammonium bromide (DDAB) containing 6% of water was added to 7 ml of toluene, and stirred with shaking to form an inverse micellar solution. Thereafter 0.025 g of $K_2PtCl_6$ and 1.2 ml of tetraethylorthosilicate (TEOS) were added to the solution above, which was then stirred until the salt was fully solubilized. Then $NaBH_4$ was poured into the salt precursor solution with rapid stirring in an argon atmosphere so that the [$BH_4$]: [$PT^{4+}$] relation was 4:1. The solution gradually turned to dark brown. The pH of the Solution was adjusted to 6.5 by the addition of an organic buffer in ethanol. The solution was aged at room temperature during 3 days previous to film formation by deep coating. According to sub-zero DSC data, the system did not contain any freezing water. The viscosity of the solution was 7.2 cps. A coating was prepared by drawing with the velocity of 12 mm/sec.

Glass substrates were cleaned in the same manner as described in Examples 1 and 2. In order to enhance the adhesion of the film to the glass, cleaned and dried glass supports were immersed in a 0.5% ethanol solution of triaminopropyltriethoxysilane, rinsed with dichloromethane and ethanol and baked in an oven at 120° C. for 2 hr. SAXS, TEM, XPS and SEM analyses were indicative of nanosize (3–5 nm) Pt (partially oxidized on the surface) particles embedded in the silica matrix. Low temperature nitrogen adsorption of the separated film dried at 100° C. in the course of 3 hr showed 37% film porosity having a mean pore diameter of 35A°. Thermo treatment of the film at 450° C. for 1 hr did not change the pore characteristics of the film. Such prepared substrates were suitable in electroless Ni plating. A typical plating solution contained 0.105 mol of $L^{-1}$ $NiSO_4 7H_2O$ and 0.195 mol of $L^{-1}$ $H_2PO_2$.

What is claimed is:

1. A method for the production of transition metal, metal alloy, metal oxide or ceramic nanomaterial particles comprising the steps of:

synthesizing nanomaterial particles in solutions of complex liquids from suitable precursors, which precursors are selected from the group consisting of suitable surfactants, alkoxides, and metal salts, by a suitable chemical reaction under mild conditions, wherein the water in the solution is nonfreezing water; and preparing fine colloids dispersed in various polymer solutions.

2. A method according to claim 1, wherein the nanomaterial particles have a diameter of 1–5 nm.

3. A method according to claim 1, wherein the mild conditions are atmospheric pressure and a temperature range of room temperature to 70° C.

4. A method according to claim 1, wherein the chemical reaction is a hydrolysis process.

5. A method according to claim 1, wherein the chemical reaction is an exchange process.

6. A method according to claim 1, wherein the solution comprises an organized water-organic surfactant.

7. A method according to claim 1, wherein the solution comprises a microemulsion.

8. A method according to claim 1, wherein the solution comprises liquid crystalline media.

9. A method according to claim 1, wherein the surfactants are selected from the group consisting of trioctylmethyl ammonium chloride (aliquat 336), dioctyldimethylammonium bromide (DDAB), cetyltrimethylammonium chloride (CTAB); sodium bis-(2-ethyl-hexyl)sulfosuccinate; and poly-ethoxyethylene-10-oleyl ether.

10. A method according to claim 1, wherein the metal oxide and metal precursors are selected from the group consisting of tetraethoxy silanes (TEOS); tetramethoxy silane (TMOS); Al, Zr isopropoxides; Fe, Mg and Al chlorides; Al and Mg acetates; Na and K orthosilicates; Zr oxychloride and transition metal salts of Fe, Co, Ni, Cu, Ru, Rh, Pd, Ir and Pt.

11. A method according to claim 1, wherein the chemical reaction is a reduction process.

12. A method according to claim 11, wherein the reducing agent is selected from the group consisting of sodium formate; hydrogen; and alcohol.

13. A method according to claim 12, wherein the alcohol is selected from the group consisting of methanol, ethanol, and isopropylalcohol.

14. A method according to claim 1, wherein the solvent is selected from the group consisting of a suitable hydrocarbon, a chlorinated hydrocarbon and ether.

15. A method according to claim 14, wherein the hydrocarbons are selected from the group consisting of octane, decane and dodecane.

16. A method according to claim 14, wherein the chlorinated hydrocarbon is 1,2-dichlorethane.

17. A method according to claim 14, wherein the ether is ethylether.

* * * * *